United States Patent Office 3,105,001
Patented Sept. 24, 1963

3,105,001
ORGANOPHOSPHORUS THIOCYANATES AND A METHOD OF PREPARING THEM
Karoly Szabo, Yonkers, N.Y., and John G. Brady, Campbell, Calif., assignors to Stauffer Chemical Company, New York, N.Y., a corporation of Delaware
No Drawing. Filed Jan. 3, 1962, Ser. No. 164,167
8 Claims. (Cl. 167—22)

This invention relates to organophosphorus compounds of the type obtained by reacting a lower trialkylphosphite with trichloromethyl thiocyanato sulfide. The invention also pertains to biocidal compositions, i.e. insecticides, miticides, nematocides and the like containing as the toxicant or active component at least one of the aforesaid organophosphorus esters including methods of preparing, using and applying such compositions.

This invention is predicated on the discovery that the reaction of about 3 moles of a lower trialkyl phosphite with about one mole of trichloromethyl thiocyanato sulfide yields a product having exceptionally high biocidal activity particularly against such pests as insects, mites, nematodes and related organisms. Although we have not, as yet, ascertained the exact chemical structure of the aforesaid chemical reaction product, it is our opinion that its chemical constitution can be interpreted on the assumption that each chlorine atom in the trichloromethyl is replaced by a phosphoryl radical. The equation as given below is postulated as an indication of the course of the reaction. It is to be understood, however, that the equation as well as the proposed chemical structure of the reaction product are of a speculative nature and therefore this explanation as to the mechanism of the reaction is not to be taken as imposing any limitation on the invention.

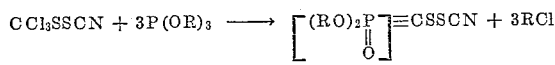

In carrying out the aforedescribed reaction, we have found that a product possessing extremely potent biocidal activity is obtained by adding about 3 moles of the phosphite ester with about 1 mole of the trichloromehtyl thiocyanato sulfide in the presence of a liquid organic solvent. The reaction is initially exothermic and external cooling may be required particularly when first introducing the phosphite ester. The products of the reaction are generally oily liquids having a refractive index in the neighborhood of about 1.4640 to 1.4870 at $N_D^{25}$ and were purified by treatment with solvents.

As state elsewhere herein, liquid organic solvents constitute a convenient medium for preparing the toxicants of the invention. Solvents which have been found suitable as the reaction media are the relatively inert type of solvents, normally liquid at room temperature. Examples of these include liquid aromatic hydrocarbons such as benzene, toluene, xylene, etc., saturated aliphatic hydrocarbons such as hexane, heptane, cyclohexane, etc. and the saturated aliphatic ethers. Any of the lower trialkyl phosphites including both branched and straight chain types are suitable for practicing the invention. By lower trialkyl phosphite is understood any trialkyl phosphite wherein the alkyl radicals each contain from 1 to 4 carbon atoms. Representative phosphite esters include trimethyl phosphite, triethyl phosphite, tri-n-propyl phosphite, tri-n-butyl phosphite, triisobutyl phosphite and the like.

The trichloromethyl thiocyanato sulfide used as the other component in the reactions described herein is a known chemical intermediate, the preparation of which is given in the chemical literature. This compound is commonly obtained by reacting approximately molar quantities of perchloromethylmercaptan and potassium thiocyanate and separating the so-produced trichloromethyl thiocyanato sulfide from the potassium chloride by-product.

Reference is now made to the following examples which are presented for the purpose of illustration only and it is to be understood that variations in producing the invention without departing from the scope or spirit thereof will be apparent to those skilled in the art to which the said invention pertains.

EXAMPLE 1

10.4 g. (0.05 M) of trichloromethyl thiocyanato sulfide was mixed with 150 ml. of benzene to which was then added 0.15 M. of triethyl phosphite. The introduction of the ester was carried out dropwise and resulted in an initially exothermic reaction, the temperature of which was maintained below 50° C. by means of an ice bath. The addition of triethyl phosphite was completed in 10 minutes and a further quantity of triethyl phosphite did not produce an increase in temperature, thus indicating that the reaction was essentially complete when the molar ratio of thiocyanate and phosphite ester was 1 to 3. The product was purified by first treating the reaction with charcoal, filtering and subjecting the filtrate to distillation under reduced pressure to remove the solvent and volatile materials, keeping the temperature in the distilling flask under 100° C. The oily residue was further purified by washing several times with fresh portions of hexane. The finally purified material was a yellow oil having a refractive index of 1.4714 at $N_D^{25}$.

EXAMPLE 2

Using the procedure of Example 1, one mole of trichloromethyl thiocyanato sulfide was condensed with 3 moles of trimethyl phosphite. In general the yield and results approximated those obtained in the earlier example. The product was an oily liquid having a $N_D^{25}$ of 1.4870.

EXAMPLE 3

One mole of trichloromethyl thiocyanato sulfide was condensed with 3 moles of triisopropyl phosphite in accordance with the procedure presented in Example 1. The yield and results generally fell in line with those obtained in the case of Example 1.

As previously pointed out, the herein described toxicants produced in the above described manner are biologically active entities which are useful and valuable in compounding biocidal compositions for the control of various pest organisms. The compounds of the invention were tested as acaricides and insecticides in the following manner.

*Acaricidal evaluation test.*—The two-spotted mite, *Tetranychus telarius* (Linn), is employed in tests for acaricides. Young Pinto bean plants are infested with several hundred mites. Dispersions of test compounds are prepared by dissolving 0.1 gram of the toxic material in ten milliliters acetone. This solution is then diluted with water containing 0.015% Vatsol (a sulfonate type wetting agent) and 0.005% Methocel (methyl cellulose) as emulsifiers, the amount of water being sufficient to give concentrations of active ingredient ranging from 0.25% to 0.005%. The test suspensions are then sprayed on the infested Pinto bean plants. After seven and fourteen days, the plants are examined both for post-embryonic forms of the mite as well as eggs. The percentage of kill is determined by comparison with control plants which have not been sprayed and the LD-50 value calculated using well-known procedures. LD-50 values are reported under the columns "2 SM" and "2 SM eggs" on the table below.

*Insecticidal evaluation tests.*—Four insect species are subjected to evaluation tests for insecticides:

(1) American cockroach (AR), *Periplaneta americana* (Linn)
(2) Milkweed bug (MWB), *Oncopeltus fasciatus* (Dallas)
(3) Confused flour beetle (CFB), *Tribolium confusum* (Duval)
(4) House fly (HF), *Musca domestica* (Linn)

The procedure for insects is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The confused flour beetles are confined in petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD-50 values are calculated using well known procedures, and reported in the table below.

Table

| Compound | House fly, μg. | Milkweed bug, percent | American roach, percent | Confused flour beetle, μg. | 2 SM, 2-Spotted mite P.E., percent | 2 SM eggs, 2-Spotted mite eggs, percent |
|---|---|---|---|---|---|---|
| (1) | 50 | .1 | .1 | 10 | <.01 | <.05 |
| (2) | <100, >10 | <.05, >.02 | <.025 | 10 | <.06, >.01 | <.06, >.01 |

[1] As produced by Example 1.
[2] As produced by Example 2.

We claim:
1. The reaction product of about 1 mole of trichloromethyl thiocyanato sulfide and about 3 moles of a lower trialkyl phosphite.
2. The reaction product of about 1 mole of trichloromethyl thiocyanato sulfide and about 3 moles of triethyl phosphite.
3. The reaction product of about 1 mole of trichloromethyl thiocyanato sulfide and about 3 moles of trimethyl phosphite.
4. The reaction product of about 1 mole of trichloromethyl thiocyanato sulfide and about 3 moles of triisopropyl phosphite.
5. A method of killing pests which comprises applying to a pest habitat a small but effective amount of the reaction product of about 1 mole of trichloromethyl thiocyanato sulfide and about 3 moles of a lower trialkyl phosphite.
6. A method of killing pests which comprises applying to a pest habitat a small but effective amount of the reaction product of about 1 mole of trichloromethyl thiocyanato sulfide and about 3 moles of triethyl phosphite.
7. A method of killing pests which comprises applying to a pest habitat a small but effective amount of the reaction product of about 1 mole of trichloromethyl thiocyanato sulfide and about 3 moles of trimethyl phosphite.
8. A method of killing pests which comprises applying to a pest habitat a small but effective amount of the reaction product of about 1 mole of trichloromethyl thiocyanato sulfide and about 3 moles of triisopropyl phosphite.

References Cited in the file of this patent
UNITED STATES PATENTS

| 2,690,450 | Gilbert et al. | Sept. 28, 1954 |
| 2,722,478 | Olin | Nov. 1, 1955 |
| 2,811,543 | Coover et al. | Oct. 29, 1957 |
| 2,818,364 | Birum | Dec. 31, 1957 |
| 2,857,305 | Birum | Oct. 21, 1958 |
| 2,908,604 | Godfrey et al. | Oct. 13, 1959 |

OTHER REFERENCES

Bull. Acad. Sci. U.S.S.R., Div. Chem. Sci., No. 1, January 1957, pp. 51–56.